Patented Feb. 6, 1940

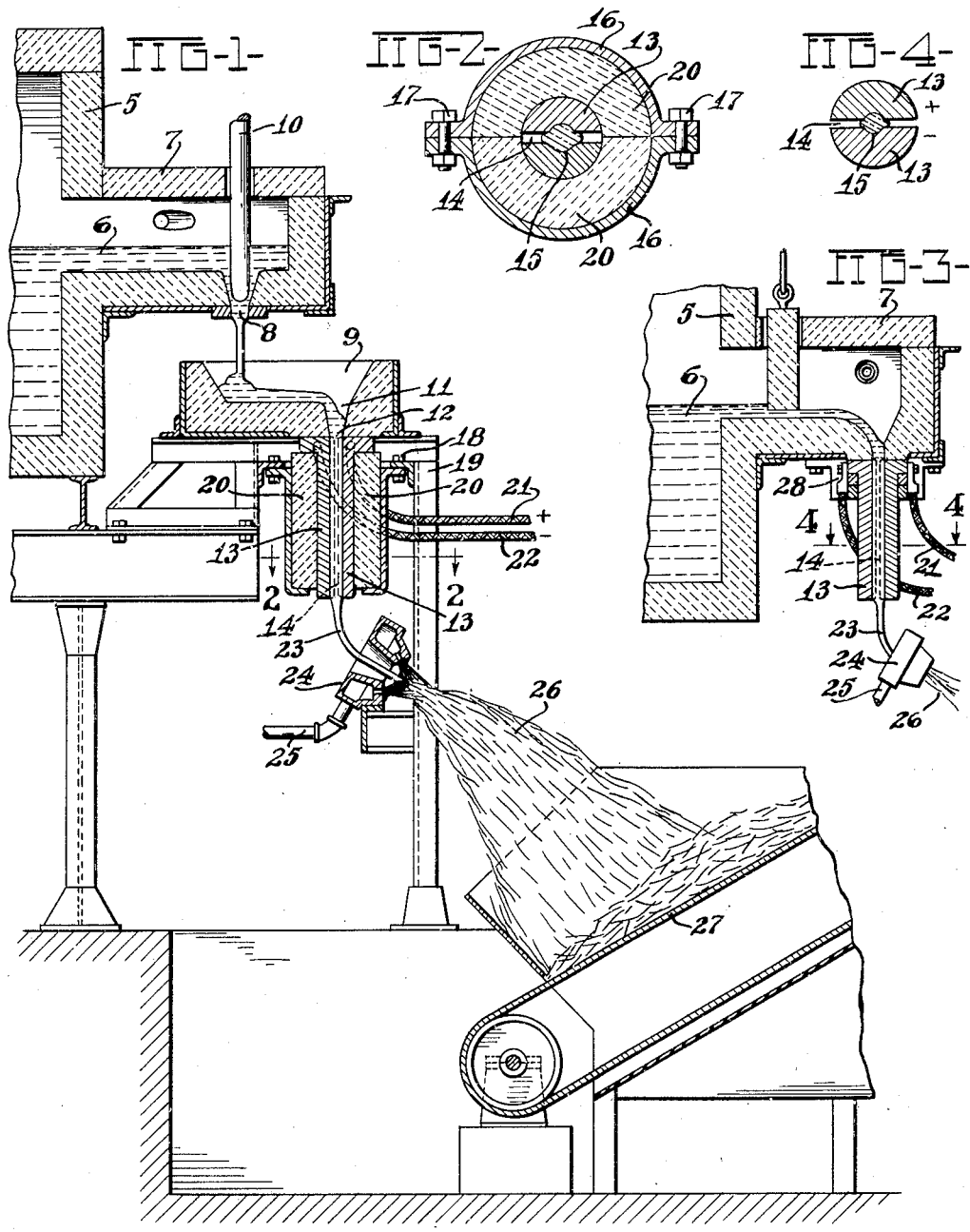

2,188,927

UNITED STATES PATENT OFFICE 2,188,927

ELECTRICALLY HEATING MOLTEN GLASS

Games Slayter, Newark, Ohio, assignor, by mesne assignments, to Owens-Corning Fiberglas Corporation, a corporation of Delaware Substitute for abandoned application Serial No. 659,453, March 3, 1933. This application February 26, 1938, Serial No. 192,688

12 Claims. (Cl. 49—55)

This application is a substitute for application No. 659,453, filed March 3, 1933.

My invention relates to apparatus for electrically heating and controlling the temperature of a stream of molten refractory material such as glass, furnace slag or the like.

An object of the invention is to provide a practical means for heating a small stream of such refractory material to a high temperature adapting it to the manufacture of fine wool. A method in commercial use at the present time for making glass wool consists in passing a small stream of molten glass through a blower by which steam or other gas it blown against the glass with sufficient force to draw the glass into threads or filaments which are accumulated to form a mass of glass wool. The coarseness or fineness of the wool produced in this manner depends to a large extent upon the temperature of the glass when it enters the blower. If the glass is comparatively cold, the individual threads or filaments of the glass wool will be correspondingly coarse. By raising the temperature, a finer product is produced. The present invention provides suitable means for heating the flowing glass to a very high temperature which enables the production of a very fine glass wool.

Other objects of the invention will appear hereinafter.

In the accompanying drawing:

Fig. 1 is a sectional elevation of an apparatus adapted for making glass wool in accordance with the present invention;

Fig. 2 is a section at the line II—II on Fig. 1, showing the electrodes and their mounting;

Fig. 3 is a sectional elevation of a modified construction; and

Fig. 4 is a section at the line IV—IV on Fig. 3.

Referring to the drawing, a glass furnace tank 5 provides a continuous supply of molten glass 6 which flows from the tank into a forehearth extension 7 provided with an outlet opening 8 extending through the floor thereof. The glass flows from the outlet in a continuous stream into an auxiliary tank or container 9. The rate of flow may be adjustably regulated and controlled by a vertically adjustable plug 10. The container 9 is formed with a well 11 extending through the floor of the container and having a bottom outlet 12.

Beneath the container 9 is a pair of electrodes 13 which, as shown in Fig. 2, are approximately semi-circular in cross-section and are separated by an air space 14 by which they are insulated from each other. The inner faces of the electrodes are formed with opposite recesses 15 which together form an approximately circular channel through which the glass flows in a continuous stream from the outlet 12. The electrodes 13 provide a bushing for the outlet, being directly beneath the container and in register with the outlet so that the well 11 and electrodes together form a conduit through which the glass flows. The electrodes may be made of any suitable conducting material which will withstand the high temperature and corrosive action of the glass. I find that wrought iron is suitable material for this purpose.

The electrodes are supported by a cylindrical casing 16, said casing being made of semi-cylindrical sections secured together by bolts 17. The upper end of the casing is flanged and connected by means of bolts 18 to a supporting structure 19. Insulating material 20 is placed within the casing 16 and surrounds and encloses the electrodes 13. This insulating material in the form shown consists of refractory blocks shaped to conform to the electrodes and the surrounding casing. Electric cables 21 and 22 are connected to the electrodes and extend therefrom to any suitable source of electric current.

As is well known, the electrical resistance of glass decreases as the temperature rises, so that molten glass is a comparatively good conductor of electricity. The stream of glass flowing downward from the outlet 12 between the electrodes thus provides a conductor permitting a flow of current therethrough. The volume of this current depends upon the difference of potential between the electrodes and the temperature of the glass flowing therebetween. Assuming that a flow of glass between the electrodes has been initiated and an electro-motive force impressed at the electrodes, a flow of electric current through the glass will take place and cause the temperature of the stream of glass to rise. If the voltage at the terminals remains constant the volume of current flow will increase as the temperature of the glass rises, causing a further rise in temperature due to the increased amperage. In this manner, the glass may be raised to a very high temperature. By regulating the voltage and amperage, any desired high temperature of the stream of glass may be maintained.

The stream of glass 23 flows downward from the electrodes and is directed into and through a blower 24 which may be of conventional form. Steam is supplied to the blower through a pipe 25 and is caused to impinge upon the stream of glass and draw it out into fine filamentary form. The fiberized glass is carried downward in the blast 26 of steam or other gaseous vehicle and accumulated on a continuously traveling conveyor 27 in the form of wool and conveyed to apparatus for further treatment.

Figs. 3 and 4 illustrate a modification in which the electrodes 13 are mounted directly beneath the outlet in the forehearth 7, the auxiliary receptacle 9 being omitted. In this construction the cylindrical casing 16 and the insulating material 20 are also omitted. The electrodes are held in position by brackets 28.

Modifications may be resorted to within the spirit and scope of my invention.

I claim:

1. The combination of a container for molten glass consisting of electrically insulating refractory material and having an outlet opening through which a stream of glass issues, a pair of electrodes positioned beyond the container and spaced apart and shaped to provide a channel therebetween, said channel being in register with said outlet and providing a passageway through which the stream of glass flows, refractory insulating material surrounding and enclosing the electrodes, and a case surrounding and enclosing said electrodes and insulating material.

2. The combination of a container for molten glass, the bottom and walls of the container consisting of electrically insulating, refractory material, said bottom having an oulet through which the glass issues, a pair of electrodes in the form of a cylinder split longitudinally to provide separate longitudinal sections spaced a short distance apart, said electrodes being positioned beneath the said outlet and in register therewith and providing a vertically disposed channel through which flows a stream of glass issuing from said outlet, said channel having substantially the same cross-sectional area as the stream flowing therethrough, and means for supplying an electric current to said electrodes and causing it to pass therethrough and through the stream of glass flowing through said channel.

3. The combination of a container for molten glass, the bottom and walls of the container consisting of electrically insulating, refractory material, said bottom having an outlet through which the glass issues, a pair of electrodes in the form of a cylinder split longitudinally to provide separate longitudinal sections spaced a short distance apart, said electrodes being positioned beneath the said outlet and in register therewith and providing a vertically disposed channel through which flows a stream of glass issuing from said outlet, said channel having substantially the same cross-sectional area as the stream flowing therethrough, means for supplying an electric current to said electrodes and causing it to pass therethrough and through the stream of glass flowing through said channel, and a cylindrical refractory bushing of insulating material surrounding and enclosing said electrodes.

4. The combination of a container for molten glass, the bottom and walls of the container consisting of electrically insulating, refractory material, said bottom having an outlet through which the glass issues, a pair of electrodes in the form of a cylinder split longitudinally to provide separate longitudinal sections spaced a short distance apart, said electrodes being positioned beneath the said outlet and in register therewith and providing a vertically disposed channel through which flows a stream of glass issuing from said outlet, said channel having substantially the same cross-sectional area as the stream flowing therethrough, means for supplying an electric current to said electrodes and causing it to pass therethrough and through the stream of glass flowing through said channel, a cylindrical refractory bushing of insulating material surrounding and enclosing said electrodes, a casing surrounding said refractory bushing, and means for securing said casing in position beneath said container and supporting said bushing and electrodes.

5. The combination of a pair of electrodes formed with opposite recesses which together provide a channel of substantially uniform cross-sectional shape and area throughout its length, the length of said channel being at least several times as great as its greatest diameter, through which channel a stream of molten glass is caused to flow, and means for supplying electric current and causing it to pass from one to the other of said electrodes through the glass flowing in said channel.

6. The combination of a pair of electrodes formed with opposite recesses which together provide a channel of substantially uniform cross-sectional shape and area throughout its length, the length of said channel being at least several times as great as its greatest diameter, through which channel a stream of molten glass is caused to flow, and means for supplying electric current and causing it to pass from one to the other of said electrodes through the glass flowing in said channel, the electrodes being spaced apart at opposite sides of the channel and thereby providing air spaces between the electrodes, said air spaces forming lateral extensions of said channel.

7. The combination of a pair of electrodes formed with opposite recesses which together provide a channel of substantially uniform cross-sectional shape and area throughout its length, through which channel a stream of molten glass is caused to flow, and means for supplying electric current and causing it to pass from one to the other of said electrodes through the glass flowing in said channel, refractory insulating material surrounding and enclosing the electrodes, and a case surrounding and enclosing the electrodes and insulating material.

8. The combination of a vertically disposed conduit through which a stream of molten glass is caused to flow downward, said conduit comprising an upper section of refractory material and an adjoining section therebeneath of electrically conducting material, said last mentioned section consisting of a pair of electrodes in the form of a cylinder split longitudinally to provide separate longitudinal halves spaced a short distance apart, the length of said cylinder being much greater than its diameter, and means for supplying electric current to said electrodes and causing it to pass therethrough and through the stream of glass as the latter flows between the electrodes.

9. The combination of a vertically disposed conduit through which a stream of molten glass is caused to flow downward, said conduit comprising an upper section of refractory material and an adjoining section therebeneath of electrically conducting material, said last mentioned section consisting of a pair of electrodes in the form of a cylinder split longitudinally to provide separate longitudinal halves spaced a short distance apart, the length of said cylinder being much greater than its diameter, means for supplying electric current to said electrodes and causing it to pass therethrough and through the stream of glass as the latter flows between the electrodes, and a cylindrical refractory bushing of insulating material surrounding and enclosing the electrodes.

10. The combination of a conduit through which molten glass is caused to flow, said conduit comprising a section of refractory material and an adjoining section of electrically conducting material, said last mentioned section consisting of a pair of electrodes in the form of a cylinder split longitudinally to provide separate longitudinal halves spaced a short distance apart, said conduit being vertically disposed to permit a stream of molten glass to flow therethrough, means for supplying electric current to said electrodes and causing it to pass therethrough and through the stream of glass as the latter flows between the electrodes, a cylindrical refractory bushing of insulating material surrounding and enclosing the electrodes, a casing surrounding said refractory bushing, and means for securing said casing in position and causing it to support said bushing and electrodes.

11. The combination with a tank to contain molten glass, said tank comprising a bottom consisting of electrically insulating refractory material and formed with an outlet opening extending therethrough, of a pair of electrodes beneath and in register with said opening and arranged to provide a comparatively long narrow channel of about the same cross-sectional area as that of the outlet opening, means for electrically insulating the electrodes from each other, and means for causing an electric current to flow from one celetrode to another through a stream of molten glass isuing from said outlet.

12. The combination with a tank to contain molten glass, said tank comprising a bottom consisting of electrically insulating refractory material and formed with an outlet opening extending therethrough, of a pair of electrodes beneath and in register with said opening and arranged to provide a comparatively long narrow channel of about the same cross-sectional area as that of the outlet opening, means for electrically insulating the electrodes from each other, and means for causing an electric current to flow from one electrode to another through a stream of molten glass issuing from said outlet, said insulating means comprising relatively narrow spaces between the electrodes and extending in the direction of the stream flow.

GAMES SLAYTER.